United States Patent
Pate et al.

(10) Patent No.: US 9,699,155 B2
(45) Date of Patent: Jul. 4, 2017

(54) CLOUD AWARE FILE SYSTEM

(71) Applicant: HyTrust, Inc., Mountain View, CA (US)

(72) Inventors: Stephen D. Pate, El Dorado Hills, CA (US); Tushar Y. Tambay, Sunnyvale, CA (US); Kelvin J. Pryse, Morgan Hill, CA (US); Lynn F. Kerby, San Martin, CA (US); Blaine T. Cuykendall, San Jose, CA (US); Thomas J. Satterlee, Felton, CA (US)

(73) Assignee: HYTRUST, INC., Mountain View, CA (US)

( * ) Notice: Subject to any disclaimer, the term of this patent is extended or adjusted under 35 U.S.C. 154(b) by 2 days.

(21) Appl. No.: 14/711,673

(22) Filed: May 13, 2015

(65) Prior Publication Data

US 2015/0244693 A1 Aug. 27, 2015

Related U.S. Application Data

(63) Continuation of application No. 13/241,104, filed on Sep. 22, 2011, now Pat. No. 9,053,339.

(Continued)

(51) Int. Cl.
*H04L 29/06* (2006.01)
*G06F 9/455* (2006.01)
(Continued)

(52) U.S. Cl.
CPC ........ *H04L 63/062* (2013.01); *G06F 9/45533* (2013.01); *G06F 17/30233* (2013.01);
(Continued)

(58) Field of Classification Search
CPC .. G06F 9/45533; H04L 63/062; H04L 63/045
(Continued)

(56) References Cited

U.S. PATENT DOCUMENTS 7,529,785 B1  5/2009 Spertus et al.
8,326,803 B1 * 12/2012 Stringham .............. G06F 3/067
                                                    707/652
(Continued)

OTHER PUBLICATIONS

Rajaravivarma, Open Source Virtual Private Network Experience in Classrooms, ACM, 2008, pp. 85-92.*

(Continued)

*Primary Examiner* — Luu Pham
*Assistant Examiner* — Jenise Jackson
(74) *Attorney, Agent, or Firm* — Ascenda Law Group, PC

(57) ABSTRACT

A virtual file system is described that is implemented in a virtualization platform as a stackable file system layer that intercepts file operations between a hypervisor and a physical file system. The virtual file system encrypts (at least in part) VM files to be stored, organizes the encrypted VM files into VM sets, and then maps and stores the encrypted VM sets into storage pools. Storage and access to files within the VM sets is controlled through the use of administrator-determined policies governing storage, security, access control, authentication, and auditing. The system and method described herein allow a seamless integration between a data center (e.g., a private cloud) and computing resources served across the internet and supported by cloud service providers (e.g., public clouds) while ensuring that the security needs of customers and cloud service providers are met.

13 Claims, 9 Drawing Sheets

Related U.S. Application Data

(60) Provisional application No. 61/407,133, filed on Oct. 27, 2010.

(51) Int. Cl.
*G06F 21/62* (2013.01)
*G06F 21/80* (2013.01)
*G06F 17/30* (2006.01)

(52) U.S. Cl.
CPC .......... *G06F 21/6218* (2013.01); *G06F 21/80* (2013.01); *H04L 63/045* (2013.01); *H04L 63/061* (2013.01); *H04L 63/0876* (2013.01)

(58) Field of Classification Search
USPC ........................................................ 713/165
See application file for complete search history.

(56) References Cited

U.S. PATENT DOCUMENTS

| | | | |
|---|---|---|---|
| 8,458,422 B1 | 6/2013 | Holdman et al. | |
| 8,510,736 B2 | 8/2013 | Yamashita | |
| 8,528,107 B1 | 9/2013 | Ginzton et al. | |
| 8,538,919 B1* | 9/2013 | Nielsen | G06F 9/5077 380/277 |
| 8,930,685 B2 | 1/2015 | Fantignie et al. | |
| 2002/0046320 A1* | 4/2002 | Shaath | G06F 3/0607 711/112 |
| 2005/0050342 A1 | 3/2005 | Boivie et al. | |
| 2007/0103984 A1 | 5/2007 | Kavuri et al. | |
| 2007/0143459 A1 | 6/2007 | Batteram et al. | |
| 2007/0250833 A1* | 10/2007 | Araujo | G06F 21/6218 718/1 |
| 2008/0155223 A1 | 6/2008 | Hiltgen et al. | |
| 2009/0083346 A1 | 3/2009 | Friauf et al. | |
| 2009/0204964 A1 | 8/2009 | Foley et al. | |
| 2009/0248870 A1 | 10/2009 | Kamei et al. | |
| 2009/0249337 A1 | 10/2009 | Vasilevsky et al. | |
| 2009/0249438 A1* | 10/2009 | Litvin | H04L 63/0263 726/1 |
| 2009/0319782 A1 | 12/2009 | Lee | |
| 2010/0037041 A1 | 2/2010 | Joshi et al. | |
| 2010/0082991 A1* | 4/2010 | Baldwin | H04L 9/083 713/176 |
| 2010/0146501 A1 | 6/2010 | Wyatt et al. | |
| 2010/0162002 A1* | 6/2010 | Dodgson | G06F 21/6218 713/193 |
| 2010/0169948 A1 | 7/2010 | Budko et al. | |
| 2010/0191783 A1* | 7/2010 | Mason | G06F 17/30088 707/822 |
| 2010/0199351 A1* | 8/2010 | Protas | G06F 21/577 726/25 |
| 2011/0113235 A1 | 5/2011 | Erickson | |
| 2011/0154325 A1* | 6/2011 | Terasaki | G06F 9/455 718/1 |
| 2011/0238737 A1 | 9/2011 | Agrawal et al. | |
| 2012/0023233 A1* | 1/2012 | Okamoto | G06F 9/4856 709/226 |
| 2012/0110328 A1* | 5/2012 | Pate | G06F 21/6218 713/165 |
| 2012/0203884 A1* | 8/2012 | von Eicken | H04L 67/00 709/223 |
| 2012/0265863 A1* | 10/2012 | von Eicken | H04L 67/00 709/220 |
| 2013/0080773 A1 | 3/2013 | Lu et al. | |
| 2014/0133315 A1* | 5/2014 | Gandhewar | H04L 63/0227 370/244 |

OTHER PUBLICATIONS

Zhu et al, The Access Control Technology of Spatial Data Files Based on File System Filter Driver, IEEE, 2008, pp. 734-737.*

"Disk Encryption Theory", in Wikipedia (http://web.archive.org/web/20090418174912/http://en.wikipedia.org/wiki/Disk_encryptian_theory), archived Apr. 18, 2009, pp. 1-6.

Dabek; et al., "Wide-Area Cooperative Storage with CFS", Proceedings of the eighteenth ACM symposium on Operating systems principles (2001), pp. 202-215.

McKusick, M K . "The Virtual Filesystem Interface in 4 4BSD", in McKusick, et al. "The Design and Implementation of the 4.4BSD Operating System", 1995, Addison-Wesley Publishing Company, Inc. (accessible at http://www.cs.berkeley.edu~pal/oslvfs), pp. 1-13.

Padala; et al., "Automated Control of Multiple Virtualized Resources", Proceedings of the 4th ACM European conference on Computer systems (Apr. 1, 2009), pp. 13-36.

Yu; et al., "Applications of a Feather-Weight Virtual Machine", Proceedings of the fourth ACM SIGPLAN/SIGOPS international conference on Virtual execution environments (Mar. 5-7, 2008), pp. 171-180.

Notice of Allowance dated Feb. 9, 2015, from U.S. Appl. No. 13/241,104, filed Sep. 22, 2011, 18 pgs.

Response to Office Action filed Oct. 23, 2014, from U.S. Appl. No. 13/241,104, filed Sep. 22, 2011, 14 pgs.

Office Action dated May 6, 2014, from U.S. Appl. No. 13/241,104, filed Sep. 22, 2011, 21 pgs.

* cited by examiner

CLOUD AWARE FILE SYSTEM

RELATED APPLICATIONS

This application is a continuation of U.S. patent application Ser. No. 13/241,104 filed on Sep. 22, 2011 (now issued as U.S. Pat. No. 9,053,339), which claims the benefit of U.S. Provisional Patent Application No. 61/407,133 filed on Oct. 27, 2010, both of which are incorporated herein by reference in their respective entireties.

FIELD OF THE INVENTION

The present invention relates generally to computer file storage, particularly storage of virtual machine files.

BACKGROUND

Server virtualization is a technology that allows the transition from distinct physical servers each running different operating systems and applications to a virtualized server that enables multiple physical servers to run concurrently as independent virtual machines (VMs) on one single physical server (the "virtual server"). The software component that allows multiple guest operating systems ("guests") to run simultaneously on the virtual server is the hypervisor (e.g., the VMware® ESX Server, Citrix® XenServer, and Microsoft® Hyper-V). The hypervisor is responsible for creating, releasing, and managing the resources of the guest VMs installed.

Server virtualization offers savings over traditional dedicated physical servers. Using virtual servers minimizes up-front capital costs, requires less hands-on management, and may even reduce software costs since most software that runs on a given operating system can be installed on virtual servers, often with fewer restrictions than for software installed in shared hosting environments. Due to the number of VMs typically running on a single machine, however, a virtual physical server tends to have limited processor time, RAM, and disk space available.

Storage and security products that have worked well in the physical computing world, however, are not well suited to server virtualization and cloud computing environments. The cost benefits of server virtualization are offset by poor storage utilization which results in increased storage costs and a new set of security threats that did not exist in the physical computing world. These security threats are one of the major reasons why information technology (IT) organizations are reluctant to use VMs for storing sensitive data and have turned instead to cloud service providers (CSPs) who provide computation, software, data access, and storage services without requiring end-user knowledge of the physical location and configuration of the system that delivers the services.

Storage vendors, as a group, have done little to accommodate the influx of server virtualization. Lack of innovation and security capabilities has resulted in the use of traditional and expensive storage solutions that are ill-equipped to deal with the new virtualization and cloud computing worlds. Placing cloud-stored sensitive data in the hands of strangers (unknown CSPs) is not just unnerving, but could also engender major legal issues when dealing with auditors and regulatory bodies (e.g., the Payment Card Industry (PCI) Security Standards Council), especially in light of data breach laws now common across the United States and in other countries.

Virtualization servers are typically set up as shown in FIG. 1. A guest operating system 101 (e.g., Microsoft® Windows XP VM) is accessed and managed by a hypervisor 102 on a virtualization server 103. The hypervisor communicates with a physical file system 104 which organizes VM files 105 stored on a local disk or via network-attached storage accessed via protocols such as an Internet-based Small Computer System Interface (iSCSI) protocol or a Network File System (NFS) protocol.

In the older, physical hardware-based computing world when mainframes and mini-computers ran in the data center and Intel-based PCs were found at home, an average consumer was not sophisticated enough to access mainframes and mini-computers to steal stored data. Current virtual servers are more vulnerable, however, both because VMs are very mobile and because home and office computing hardware (Intel® x86 architecture) is often the same as that used in a data center so an average computer user is often knowledgeable enough to access a VM which is stored in a folder on a disk. In short, what would be the operating system's physical disks (for example C: and D:) are now regular files that are easily viewable and easy to copy. Stealing a VM then, is simply a matter of copying (e.g., to a USB thumb drive) 106 the set of VM files, and carrying them out of a data center without authorization. Alternatively, the set of files can be copied over a network (107) to another machine, again without authorization. These appropriated files can run on a home personal computer using free tools from all the major hypervisor vendors.

Virtual servers can be secured, but that security comes at a cost. And, if that security impedes the technological benefits that virtualization provides, some companies will avoid virtualization when sensitive data is being processed and thereby miss out on the benefits of virtualization and cloud computing.

SUMMARY OF THE INVENTION

In one example is provided a computing system for secure storage of one or more virtual machine file comprising: a file system driver of a first computing system configured to intercept from a hypervisor of the first computing system a command to store one or more virtual machine file; a communication module of the first computing system configured to communicate securely with a key store on a second computing system to retrieve one or more encryption key and with a policy store on the second computing system to retrieve one or more policy rule; a key management module of the first computing system configured to obtain the one or more encryption key from the communication module; and a storage management module of the first computing system configured to obtain the one or more policy rule from the communication module and to inform the file system driver based on the obtained one or more policy rule how to store the one or more virtual machine file in one or more storage pool of a third computing system; wherein the file system driver is further configured to encrypt at least partially the one or more virtual machine file using the one or more obtained encryption key received from the key management module; and transfer the one or more at least partially encrypted virtual machine file through a virtual machine file system of the first computing device to the one or more storage pool based on the retrieved one or more policy rule.

In another example is provided a computing system for accessing one or more virtual machine file stored securely and at least partially encrypted, the system comprising: a file system driver of a first computing system configured to intercept from a hypervisor of the first computing system a command to access the one or more at least partially encrypted virtual machine file; a communication module of the first computing system configured to communicate securely with a key store on a second computing system to retrieve one or more encryption key and with a policy store on the second computing system to retrieve one or more policy rule; a storage management module of the first computing system configured to obtain the one or more policy rule from the communication module and to inform the file system driver based on the one or more obtained policy rule how to access the one or more at least partially encrypted virtual machine file in one or more storage pool of a third computing system; and a key management module of the first computing system configured to obtain the one or more encryption key from the communication module; wherein the file system driver is further configured to retrieve the one or more at least partially encrypted virtual machine file through a virtual machine file system of the first computing device; decrypt the one or more at least partially encrypted virtual machine file using the one or more obtained encryption key received from the key management module; and transfer the one or more decrypted virtual machine file to the hypervisor.

In another embodiment is provided a method for secure storage of one or more virtual machine file, the method comprising: intercepting with a file system driver on a first computing system from a hypervisor of the first computing system a command to store the one or more virtual machine file; retrieving with a communication module of the first computing system through a secure communication channel one or more encryption key from a key store on a second computing system and one or more policy rule from a policy store on the second computing system; obtaining with a key management module of the first computing system the one or more encryption key from the communication module; obtaining with a storage management module of the first computing system the one or more policy rule from the communication module and informing the file system driver how to store the one or more virtual machine file in one or more storage pool of a third computing system based on the one or more received policy rule; encrypting at least partially one or more virtual machine file using the one or more encryption key received from the key management module; and transferring with the file system driver the at least partially encrypted one or more virtual machine file through a virtual machine file system of the first computing system to the one or more storage pool based on the retrieved one or more policy rule.

In another embodiment is provided a method to access one or more virtual machine file stored securely and at least partially encrypted, the method comprising: intercepting with a file system driver on a first computing system from a hypervisor of the first computing system a command to access the one or more at least partially encrypted virtual machine file; retrieving with a communication module of the first computing system through a secure communication channel one or more policy rule from a policy store on a second computing system and one or more encryption key from a key store on the second computing system; obtaining with a storage management module of the first computing system the one or more policy rule obtained from the communication module; accessing through a virtual machine file system of the first computing system the one or more at least partially encrypted virtual machine file in the one or more storage pool of the third computing system based on the obtained one or more policy rule; obtaining with a key management module of the first computing system the one or more encryption key from the communication module; decrypting the one or more accessed partially encrypted virtual machine file based on the one or more obtained encryption key; and transferring with the file system driver the decrypted one or more virtual machine file to the hypervisor.

In yet another embodiment is provided a non-transitory computer readable medium having stored thereupon computing instructions comprising: a code segment to intercept with a file system driver on a first computing system from a hypervisor of the first computing system a command to store the one or more virtual machine file; a code segment to retrieve with a communication module of the first computing system through a secure communication channel one or more encryption key from a key store on a second computing system and one or more policy rule from a policy store on the second computing system; a code segment to obtain with a key management module of the first computing system the one or more encryption key from the communication module; a code segment to obtain with a storage management module of the first computing system the one or more policy rule from the communication module and informing the file system driver how to store the one or more virtual machine file in one or more storage pool of a third computing system based on the one or more received policy rule; a code segment to encrypt at least partially one or more virtual machine file using the one or more encryption key received from the key management module; and a code segment to transfer with the file system driver the at least partially encrypted one or more virtual machine file through a virtual machine file system of the first computing system to the one or more storage pool based on the retrieved one or more policy rule.

In yet another embodiment is provided a non-transitory computer readable medium having stored thereupon computing instructions comprising: a code segment to intercept with a file system driver on a first computing system from a hypervisor of the first computing system a command to access the one or more at least partially encrypted virtual machine file; a code segment to retrieve with a communication module of the first computing system through a secure communication channel one or more policy rule from a policy store on a second computing system and one or more encryption key from a key store on the second computing system; a code segment to obtain with a storage management module of the first computing system the one or more policy rule obtained from the communication module; a code segment to access through a virtual machine file system of the first computing system the one or more at least partially encrypted virtual machine file in the one or more storage pool of the third computing system based on the obtained one or more policy rule; a code segment to obtain with a key management module of the first computing system the one or more encryption key from the communication module; a code segment to decrypt the one or more accessed partially encrypted virtual machine file based on the one or more obtained encryption key; and a code segment to transfer with the file system driver the decrypted one or more virtual machine file to the hypervisor.

DETAILED DESCRIPTION OF THE INVENTION

Figure 1:
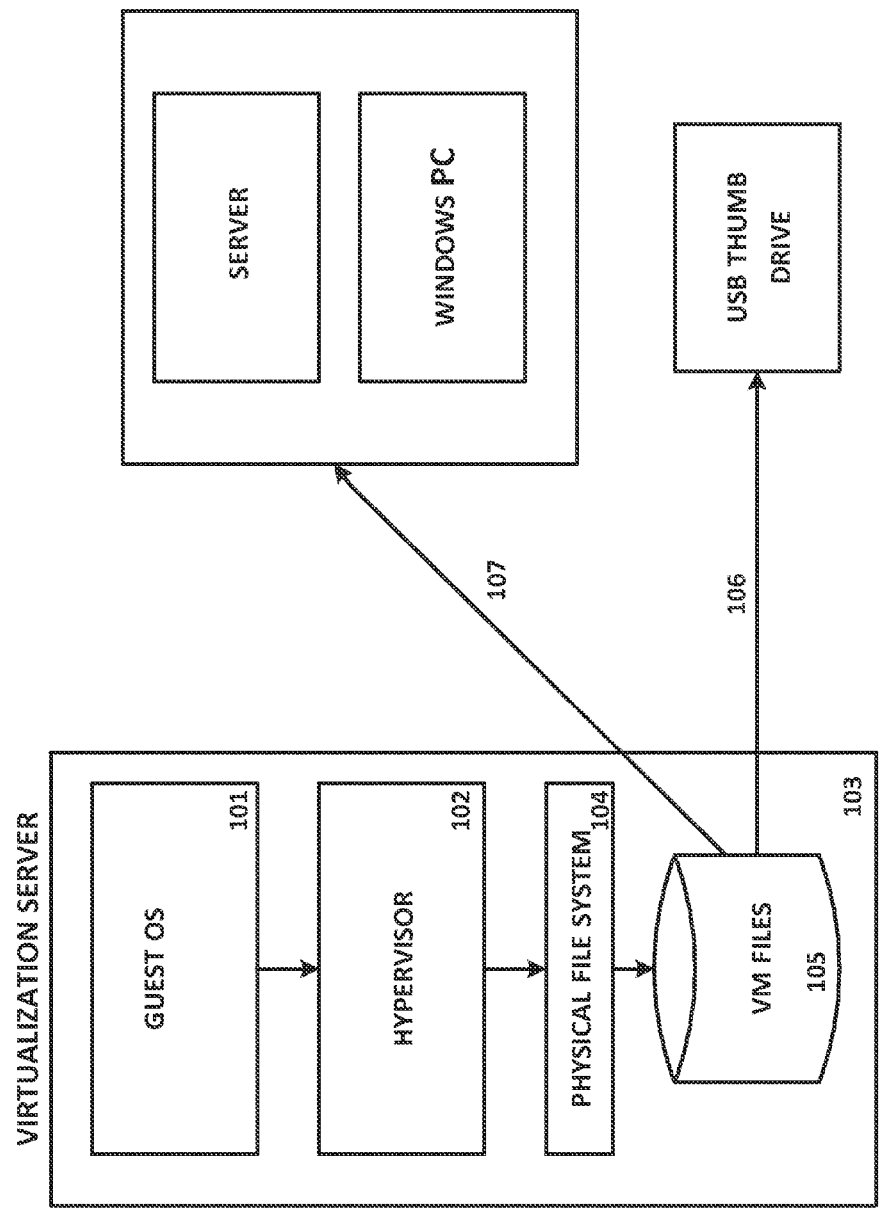
FIG. 1 is a block diagram illustrating the typical organization of a virtualization server known in the art.

A cloud-aware file System (CAFS) is described herein that bridges physical and virtual computing worlds and the traditional storage servers that still dominate the IT industry today. CAFS ensures that VMs are protected, regardless of where they are used or whether they are moved, and allows CSPs to support secure, multi-tenant environments in which different customer workloads can be run securely but with no overlap in administrative, access, or auditing capabilities. CAFS offers a variety of features which provide a seamless integration between on-line access, backup and cloud migration to achieve security and maximize the use of existing storage technologies.

CAFS provides support for standard protocols that allow client machines to retrieve files from a server machine. CAFS' ability to integrate with standard protocols allows CAFS to be plugged into any virtualization platform that supports NFS (e.g., VMware® ESX, Microsoft® Hyper-V, Citrix® XenServer, and Red Hat KVM) or similar protocols.

Although most virtualization platforms support iSCSI and Fiber Channel, CAFS offers greater flexibility by being able to see individual files of the VM and then store and access those files according to storage policies (described in greater detail below). By having access to the different files within the VM, files can be encrypted on an as-needed basis as data is written through CAFS to back-end storage. CAFS minimizes the impact on computing performance caused by encryption by only encrypting those parts of the VM that customers require to be encrypted (e.g., application data). CAFS further reduces any performance penalty associated with encryption by utilizing any hardware cryptographic support available.

CAFS integrates policy and encryption key management thereby allowing CAFS to build storage, encryption, and access controls that apply to a single VM or a set of VMs. By grouping one or more related VMs into VM sets, and having policies that apply to a VM set, CAFS provides a separation of duties at the storage layer, a feature that would be beneficial to multi-tenant providers such as CSPs. To maintain security, encryption keys and policies are created and managed on an external key and policy server which is a hardened appliance with no login access. The encryption keys themselves are protected on disk by being encrypted with a symmetric key which is itself encrypted with a Master Key. CAFS further supports automatic (i.e., while the VM is being accessed) key rotation (a process that requires decrypting with an old key and re-encrypting with a new key) while on-line (i.e., without the need to shut down the VM). This can be significant since routine encryption key rotation processes are often required by regulatory bodies such as PCI.

CAFS implements a flexible storage model in which a storage pool mapper is able to store separate files of a VM in one or more storage pool (a collection of similar local or remote storage devices) and migrate VM files among the storage pools while the VM is being accessed for other purposes. One of skill in the art will understand that the one or more storage pool can exist on the same physical host on which CAFS is running, and/or one or more storage pool can be located on non-direct-attached, separate storage devices. At an administrator-defined time interval, CAFS makes VM replicas which can be sent to remote servers for disaster recovery purposes or to move the VMs into and out of the cloud.

When a VM is accessed, CAFS provides audit records that aid in support of various compliance requirements for an organization or service provider. Furthermore, CAFS provides information about VM usage and sets of VMs that allow cloud service providers to provide per-customer billing.

CAFS Fundamentals. One of skill in the art will recognize that although CAFS is discussed herein as using NFS as an exemplary standards-based file system protocol, CAFS can interface with any standards-based file system or storage protocol that allows client machines to retrieve files from a server machine.

Figure 2:
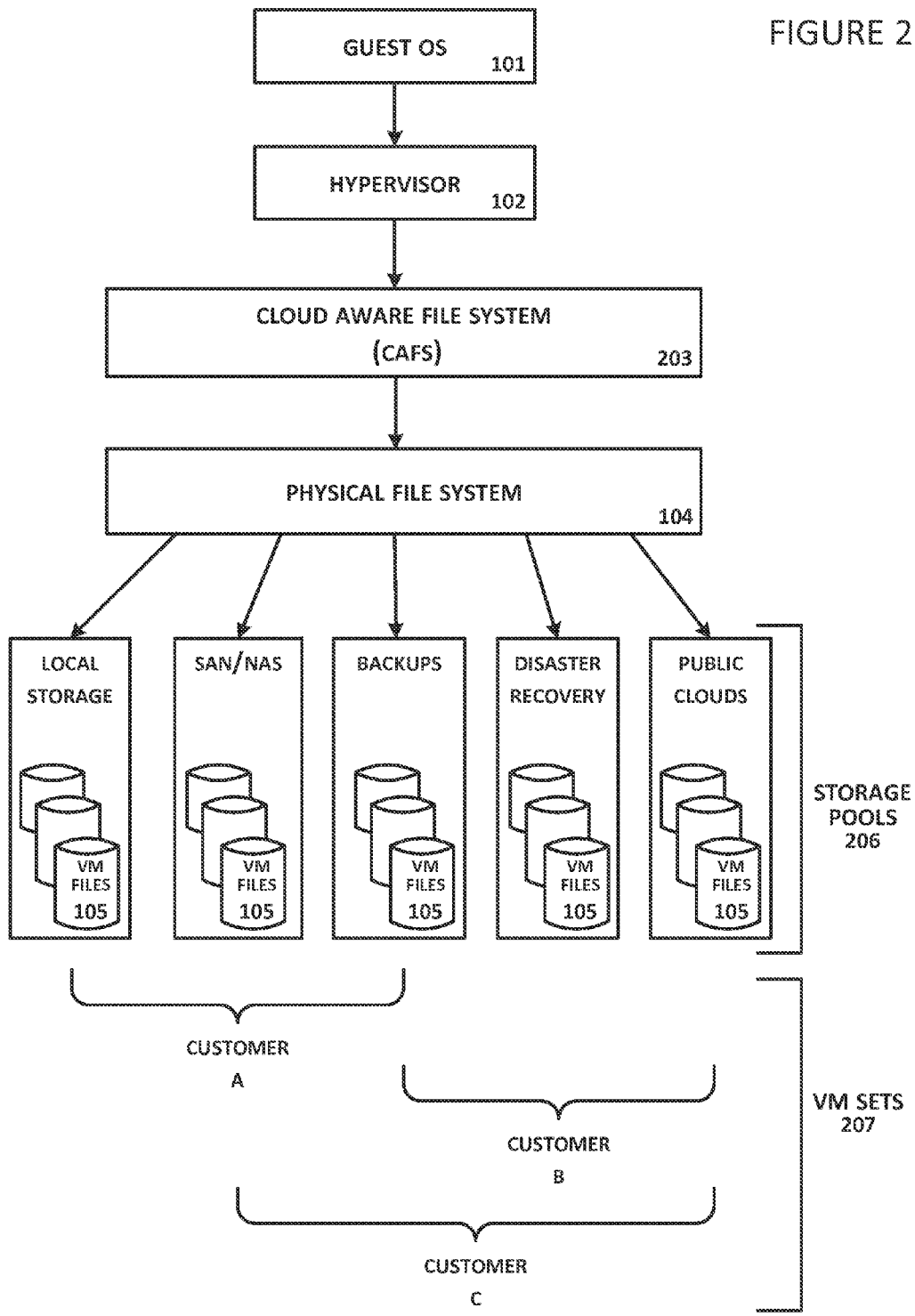
FIG. 2 is a block diagram illustrating where CAFS resides within a virtualization platform according to one embodiment.

FIG. 2 illustrates how CAFS is positioned within the virtualization environment. Within a computing system, a hypervisor 102 provides a virtualization platform for a guest operating system 101, and is responsible for managing execution of its commands. CAFS 203 is implemented between hypervisor 102 and an existing physical file system 104 to control the organization of and access to local and/or remote storage pools 206 in which VM files 105 are stored as VM sets 207 (discussed in greater detail below). If CAFS 203 itself is being run as a VM, CAFS 203 can be on the same physical host as hypervisor 102. Preferably, however, CAFS is on a physical host separate from the physical host running hypervisor 102.

Figure 3:
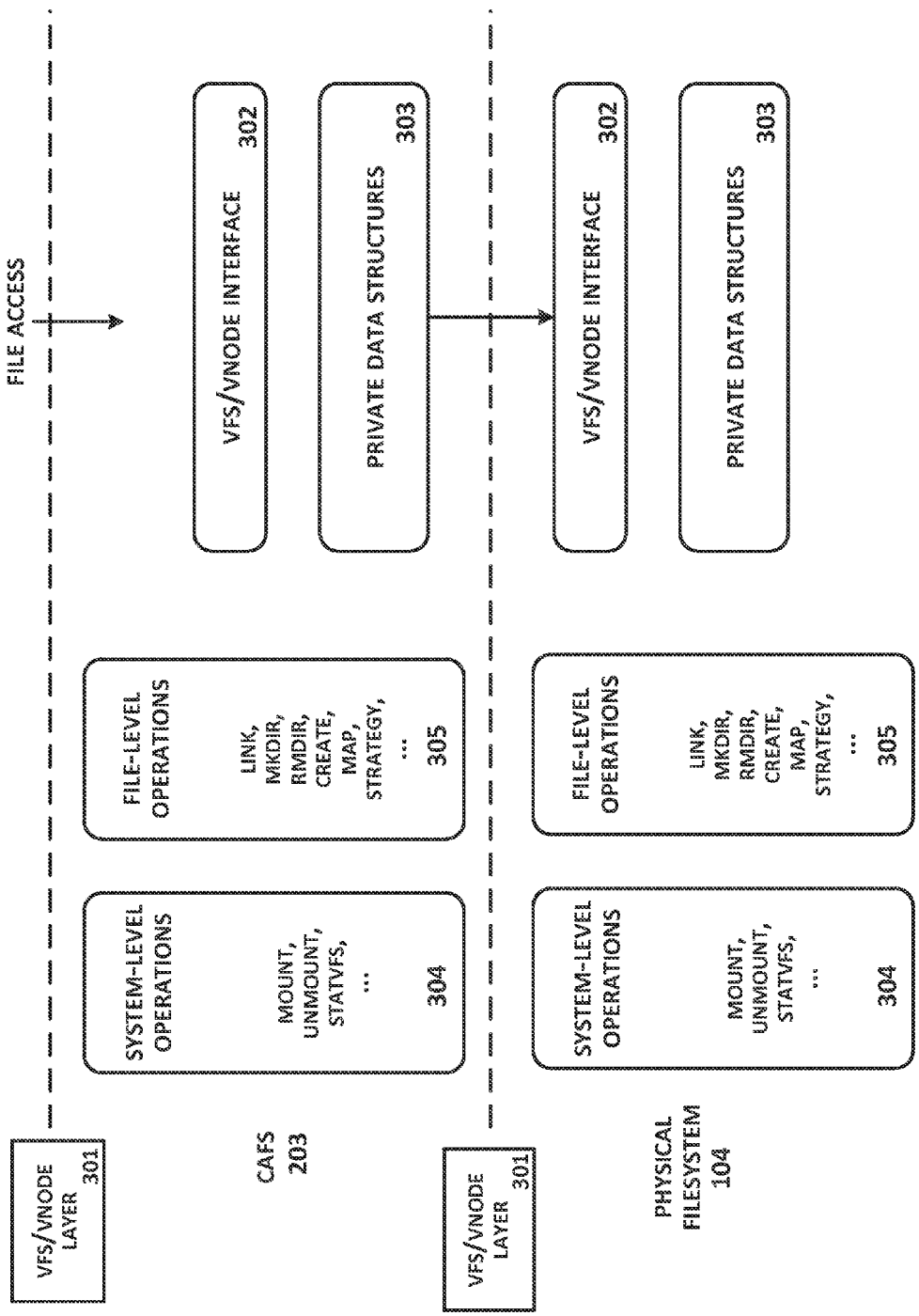
FIG. 3 is a block diagram illustrating how CAFS interfaces with a physical file system to intercept file calls in one embodiment.

CAFS 203 is a virtual file system (VFS), preferably implemented as a stackable file system layer preferably in a FreeBSD file system framework, although one of skill in the art will understand that CAFS 203 can be implemented in other computing frameworks and environments. FIG. 3 illustrates how CAFS functions as a stackable file system layer. CAFS 203 intercepts file operations at a VFS/vnode interface layer 301. Physical file system 104 is unaware of the presence of CAFS 203. The kernel responds to any file-related system calls by packaging arguments and invoking the top-most layer of the stack through a set of VFS or vnode interfaces 302. VFS interfaces are application programming interfaces (APIs) in the kernel that allow file system-level operations 304 such as mount, unmount, and stat (for printing file system statistics). Vnode operations are file-level operations 305 such as open, read, write, close and stat (for printing file statistics). Through the use of private data structures 303 (which are referenced from the v_data field of the vnode structure), CAFS 203 is able to maintain the mapping between its vnode structure and the vnode structure of the underlying file in the physical file system. For further details about the BSD VFS, please see McKusick, M. K., "The Virtual Filesystem Interface in 4.4BSD", in McKusick, et al. "The Design and Implementation of the 4.4BSD Operating System", 1995, Addison-Wesley Publishing Company, Inc., which is incorporated herein by reference in its entirety.

Each open file in FreeBSD UNIX is represented by a vnode structure. All VM files 105 have entries in the physical file system where CAFS is mounted, an area used by CAFS as the default backing store. Some of those entries are special redirector links that reference files in one of the available storage pools. In this case, the CAFS vnode private structure will point to the vnode of the file in that particular storage pool.

Figure 4:
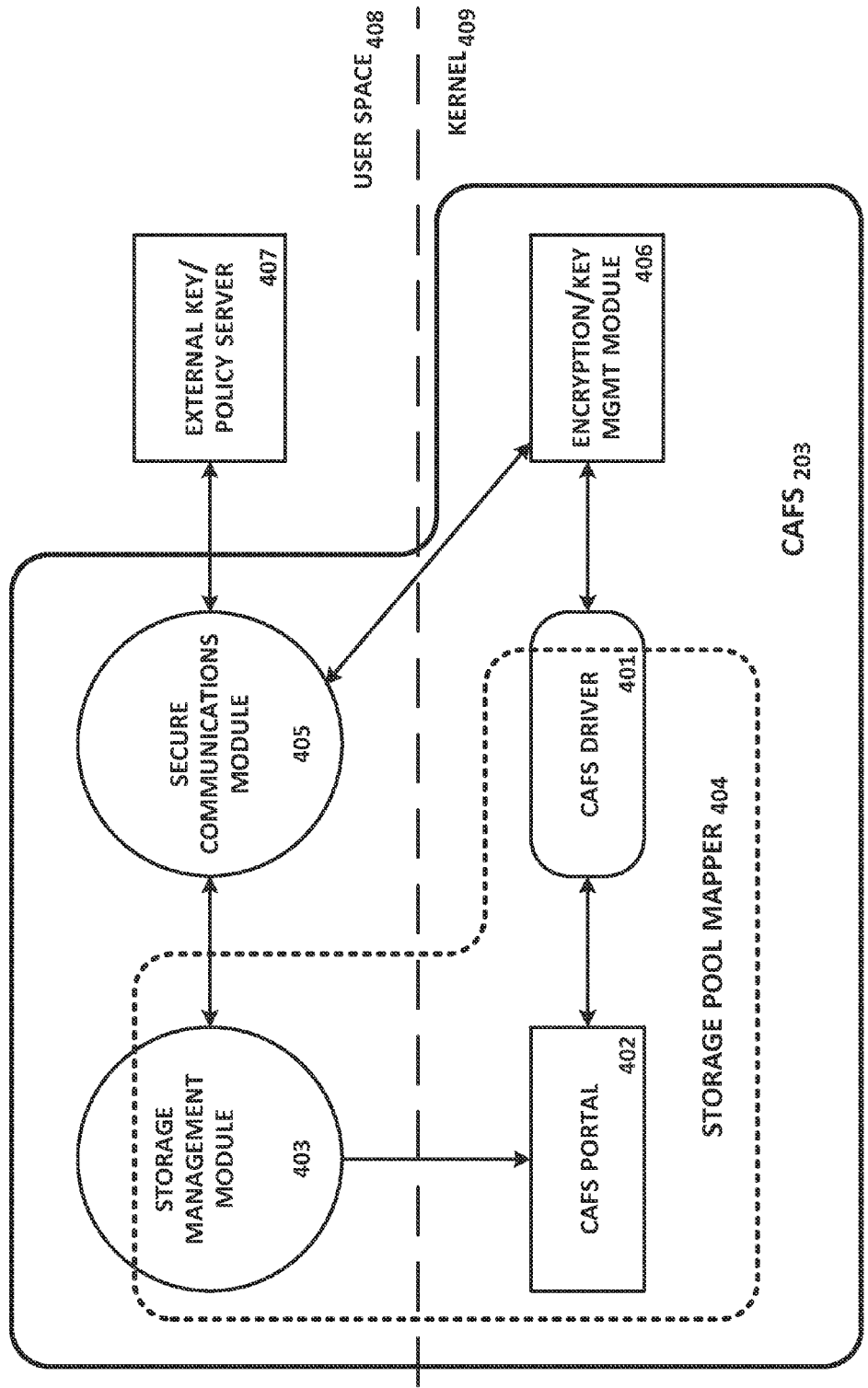
FIG. 4 is a block diagram showing components of CAFS according to one embodiment.

As shown in the block diagram of FIG. 4, several components collectively form the CAFS framework. Some of these components run in user space 408 as background applications (e.g., daemons) while others run inside the operating system kernel 409. The specific components are a CAFS file system driver 401, a CAFS portal 402, a storage management module 403, a secure communications module 405, and an encryption/key management module 406.

CAFS driver 401 is a virtual file system driver conforming to the VFS/vnode architecture as described above. CAFS driver 401 is preferably implemented as a stackable file system driver, as for example, in a UNIX FreeBSD kernel. Stacking CAFS driver 401 on top of physical file system 104 provides additional capabilities above those of physical file system 104, thereby achieving greater flexibility because new file system features can be added without modifying physical file system 104. CAFS driver 401 sits on top of one or more storage pool that can be represented by a file system exporting local physical storage or one of a number of other storage pools comprised of different storage types such as iSCSI and NFS.

CAFS portal 402 is a pseudo device driver used for communication between CAFS driver 401 and storage management module 403.

Storage management module 403 is a management module (preferably a daemon) responsible for performing tasks that are best suited to running outside of kernel 409 (i.e., those tasks easier to implement in user space). Storage management module 403 is responsible for handling policy decisions, including informing CAFS of where to store VM files 105 (i.e., into which storage pools) as the VM files 105 are created.

CAFS driver 401, CAFS portal 402, and storage management module 403 also act in concert as a storage pool mapper 404 (as discussed in greater detail herein).

Secure communications module 405 is a module (preferably a daemon) that is responsible for communications with a key and policy server 407 to fetch policies and keys as VMs are accessed.

Encryption/key management module 406 is a kernel module that interfaces with the operating system's cryptographic interfaces as well as with secure communications module 405 to fetch encryption keys on an as-needed basis (as discussed in greater detail below).

Storage Pools.

CAFS stores each VM in one or more storage pool 206 through the use of storage pool mapper 404 with individual plugin modules that make use of the API (e.g., one plug-in module may be for SCSI storage, and another may be for cloud storage, but both will use the same API). Storage pool mapper 404 is a software interface between CAFS driver 401, storage management module 403, and CAFS portal 402 which provides a set of functions that make each storage pool look identical regardless of whether the storage pool is backed by physical disks or by a layer that supports backup and/or replication. Storage pool mapper 404 maps components of each VM (i.e., VM files 105) to their various storage pools (for example, C: uses mirrored storage, D: uses encrypted SSD storage), and is also able to move VM files 105 among storage pools while the VM is still being accessed.

The operations exported by each storage pool mapper 404 to the storage pools 206 allow the seamless migration of VM components between different pools, the dynamic rekeying of encrypted VM files 105, and the shredding of VM files 105. Operations supported by each storage pool mapper include, without limitation:

OPEN—return a handle to a file within the pool.
READ—read from the file.
WRITE—write to the file.
COMPRESS—compress one or more components of a VM. This operation will compress the portions of the VM that are held within this storage pool. This operation is used when the VM is not being accessed to further reduce storage space.
REKEY—rotate encryption keys. This involves switching from one encryption key to another.
SHRED—remove data completely. This operation involves data scrubbing.
SNAPSHOT—used for backup capabilities, this operation takes a snapshot of a set of VM files.
SPACE_ALLOC—pre-allocate space for a future VM. When creating new VMs, one of the most time-consuming operations is allocation of a zero-filled disk. Some storage pools may be using file systems that support pre-allocation, and most file systems will support sparse files. A mapper running on top of such a file system will utilize the features of the underlying file system to best achieve space allocation.
PULL—pull data from a VM in another storage pool.
PUSH—push data to a VM in another storage pool.

Storage pool 206 can be any back-end storage device, including, without limitation, locally attached storage (e.g., SATA (Serial Advance Technology Attachment (SATA) drives, solid-state drives (SSD), or a redundant array of independent disks (RAID) controller), network-attached storage (NAS), storage area networks (SAN) (via Fiber Channel), an archive server located on a separate server, a tape archive, a cloud portal (a pool that has storage in the cloud), and/or block storage over internet protocols (e.g., iSCSI). Storage pools may comprise local storage for on-line access, local or remote storage for secure backups, and/or remote storage for disaster recovery or for interaction between the data center and the cloud.

Administrators can use different classes of storage and different levels of redundancy when provisioning storage for a physical system depending on the data being stored. In a UNIX database server running Oracle, for example, a root file system ("/") of the operating system does not need to be stored in a device with high access speeds, but should be mirrored because losing the file system would render the machine unusable. Access performance and redundancy are critical, however, for customer database files ("/uo1", "uo2/"), so the fastest storage available should be used and the storage will be mirrored. Swap space files ("/swap"), on the other hand, are not critically important, so the data can be stored unmirrored in inexpensive storage. And temporary files ("/tmp", files which are not expected to survive a reboot) can be stored in any storage pool. When using virtualization technology such as VMware's ESX Server, however, this logical separation of data types becomes blurred. VMs may be stored on an external server using NFS, in which case the storage backing the NFS exported data store is all one type. In this scenario, expensive enterprise storage could end up being used for both /swap and /tmp, with the consequent result that the move to virtualization (which should reduce costs) could end up costing more than physical servers because of increased storage costs.

CAFS allows individual files from any given VM to be mapped to separate storage pools (each of which may have different characteristics) regardless of the guest operating system. A major advantage of this purpose-directed storage provisioning is that storage and performance costs can be minimized. As one example, storage provisioning can be arranged as follows:

Some virtual disk files can be placed in storage with de-duplication capabilities. If a customer is storing 1,000 VMs running Windows, significant cost reductions can be achieved if the C: drives are placed in de-duplicated storage since the C: drives are likely substantially identical.

Application data (e.g., D: drive files) can be placed on faster storage.

Encryption of only sensitive data (rather than all files on a VM) can provide security guarantees that a customer needs while allowing non-sensitive data to be stored in pools requiring less performance overhead.

Storage pools can reference external storage in the cloud rather than remain local to the environment in which CAFS runs, yet still provide secure VM backups.

To migrate stored VM files 105 from one storage pool to another, a snapshot of the VM is taken and copied (entirely or incrementally) elsewhere (to disk or tape). The same principle applies for replication for disaster recovery or for moving in or out of a cloud: a copy of the VM is made and moved to another server in a different physical location.

Multi-Tenancy Features (PM Sets).

Many CSPs operate "customer islands" to customize multi-tenant virtualization environments. Each customer is given a group of physical machines and the CSP provides a way to segregate these machines into customer islands so that there is no overlap between the workloads and data of one customer and those of another customer. This practice is an inefficient way of managing physical servers and diminishes the benefits of using cloud storage. CAFS instead enables multi-tenant virtualization environments through the use of VM sets.

A VM set is a collection of VMs that are related and governed by the same customer-specific policies. VM sets share a similar set of properties such as: storage type (mirroring, de-duplication, number of replicas), security (keys, key states, and associated encryption policies), access controls, and audit records. Grouping VMs into sets with different policies based on customer-specific needs ensures that customers' groups of VMs do not overlap in either use or storage. In a multi-tenant environment, grouping of VMs into a VM set allows one tenant's VMs to be virtually (but not necessarily physically) separated from those of another tenant and to be managed independently, even if the same physical servers and the same storage are being used by one or more tenant. In a CSP model where multi-tenant capabilities are needed, each tenant has a separate administrator who controls its own VM sets, as well as separate administrators managing encryption keys and VM storage. Referring again to FIG. 2, for example, VM set 207 for Customer A may have VM files 105 in local storage pools, SAN/NAS pools, and backup pools, VM set 207 for customer B may have VM files 105 in backup pools, disaster recovery pools, and public clouds, and VM set 207 for customer C may have VM files 105 stored in SAN/NAS pools, backup pools, disaster recovery pools, and public clouds. Customers A, B, C may all have VM files 105 in the same backup pool, but since VM files 105 are grouped into sets, customer A's policies restrict access to its VM files 105 such that only customer A's administrators/users can access VM set 207 belonging to A. Likewise, customer B's policies and customer C's policies restrict access to their respective administrators/users. Yet each customer A, B, and C gains the benefit of lower storage costs because each has optimized its storage based on the type of storage needed for its VM files.

Grouping VMs into VM sets can be beneficial within an IT department as well as in a multi-tenant cloud environment. Within a company's IT department's infrastructure, for example, VM sets may be preferred because:

Different VMs can have different storage requirements based on the importance of the application data and the application's performance profile.

A VM set may have different replication (disaster recovery) and backup needs.

A VM set can be accessed by a set of virtual servers that have been specified to have access.

For a CSP, the reasons are somewhat similar but in addition, the following security capabilities can be achieved:

VM sets can have different administrators.

VM sets can be assigned to different storage pools.

Customer-specific data can be provided by audit records generated on a per-VM set basis.

Separate billing capabilities can be provided by assessing VM usage on a per-VM set basis.

Access can be controlled with different encryption keys for different VM sets, as well as for VM components within a VM set.

VM Set Policies.

Each VM set has associated policies that establish the administrator-determined rules governing storage, security, access, authentication, and auditing for that VM set. The defined parameters of each policy are defined within the policy descriptor and include information such as, without limitation:

Storage Policy

Which storage pools should be used?

Which parts of a VM should be placed in which storage pool?

Which VM components should use de-duplication?

Which VM components should be encrypted?

How many replicas are needed? Where are replicas stored?

Security Policy

How many encryption keys are used and for which VM components?

When do encryption keys expire (thereby rendering the VM unusable)?

How often and when do encryption keys need to be rotated?

Access Control Policy

Which hypervisors/servers can access this VM?

During what timeframe can VMs in the VM set be accessed?

Should an audit record be generated?

If the VM set is accessed outside of the time window, should further access be prevented?

Authentication Policy

Is communication with a centralized management server required prior to allowing access?

Can authentication occur locally and if so, by what mechanism?

Audit Policy

What level of granularity is needed (open, close, read, write, time of day)?

Where should audit data be sent?

Because NFS has limited security mechanisms, CAFS uses these policy descriptors as authentication and access controls for any VM set accessed through NFS. For example, when a VM set is created, the servers that are allowed to access the VM are specified within the policy for that VM set. Access by any server not listed will be denied and an audit record will be generated. Policies also designate access windows (the specific time periods during which the VM can be accessed). As an example, a customer workload running in the cloud should only be accessed during business hours Monday to Friday. Any attempt to access the VM at night or over the weekend will result in a denial and an audit record being generated.

In a preferred embodiment, policies themselves are not stored with the VM set or with any of the VMs. Instead, CAFS stores a globally unique identifier (GUID) with each VM file. The GUID is a reference to an object (or file) that is stored on the key and policy server and used to fetch the associated policy keys when VM files are accessed. The object or file referenced by the GUID contains CAFS-specific metadata that travels with the VM and has enough information to allow CAFS to find the appropriate key and policy server to fetch the associated policies and encryption keys. Such a reference system is desirable for two reasons. First, VMs are not static. They can be accessed on-line, moved to backup media, migrated from one storage platform to another (including in and out of a cloud), and moved from large servers to desktops and notebooks. Because of security concerns, policy descriptors and encryption keys should not be stored directly with the VM. Second, VM sets names can be reused. For example, a VM set called my_vmset that is accessible through NFS mount point /mnt could be archived and deleted from primary storage. In the meantime, another VM with the same name and mount point could be created. At some stage in the future, restoration of one of these VMs could be problematic because both have the same name and mount point. If each VM contains encrypted data, CAFS needs to know which policy descriptor and which encryption keys to use, and which storage policy to apply on restore.

Figure 5:
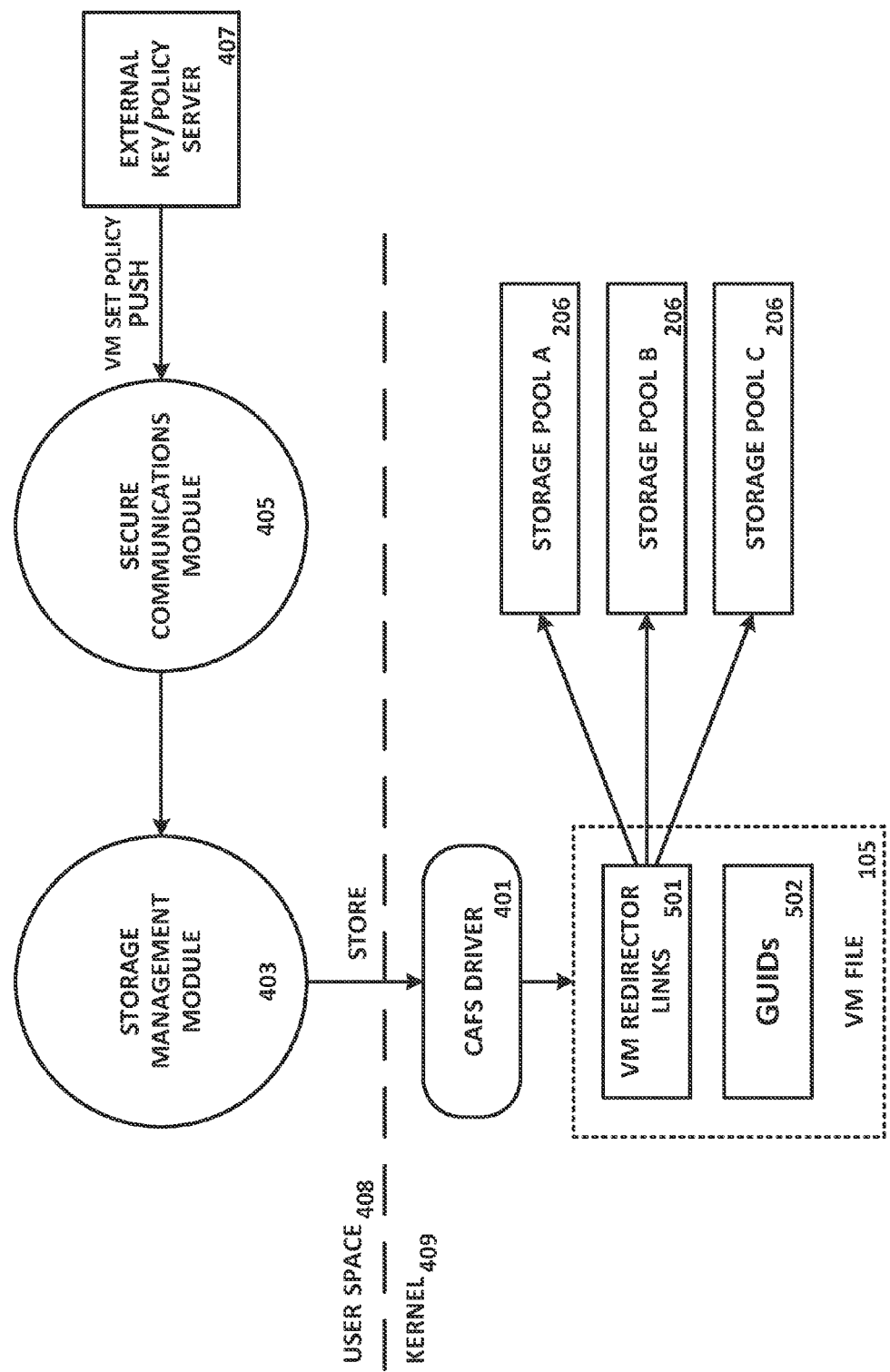
FIG. 5 is a block diagram illustrating how CAFS maps virtual machine file names through links to storage pools in one embodiment.

FIG. 5 shows the interaction between the different CAFS components when receiving new or updated VM set information. CAFS maps VM file names through links to one or more storage pools. Creation of a new VM set involves pushing a VM set descriptor from key and policy server 407 through secure communications module 405 and storage management module 403 to CAFS driver 401, which then creates the appropriate storage for the new VM set and exports one or more VM file 105 (with VM redirector links 501 and GUIDs 502) through an NFS mount point.

Shown below is an exemplary XML representation of VM set information that is received from the key and policy server:

```
<?xml version="1.0" encoding="ISO-8859-I"?>
<vmset>
    <name>my__vmset</name>
    <mnt>/nfs</mnt>
    <pd>45aa9e57-bf64-11df-8d3e-000c29abeb4d</pd>
    <vmserv>755083456</vmserv>
</vmset>
```

The mount point (mnt tag) and name of the VM set (name tag) contain enough information to create an appropriate path from which the VM set can be accessed. The vmserv tag lists the virtualization servers that are able to access this VM set. The policy descriptor (pd tag), also referenced by a GUID, is fetched in response to a VM access or creation. Once fetched, policy descriptors are cached in memory so that they can be easily retrieved on a subsequent access from a virtualization server.

Figure 6:
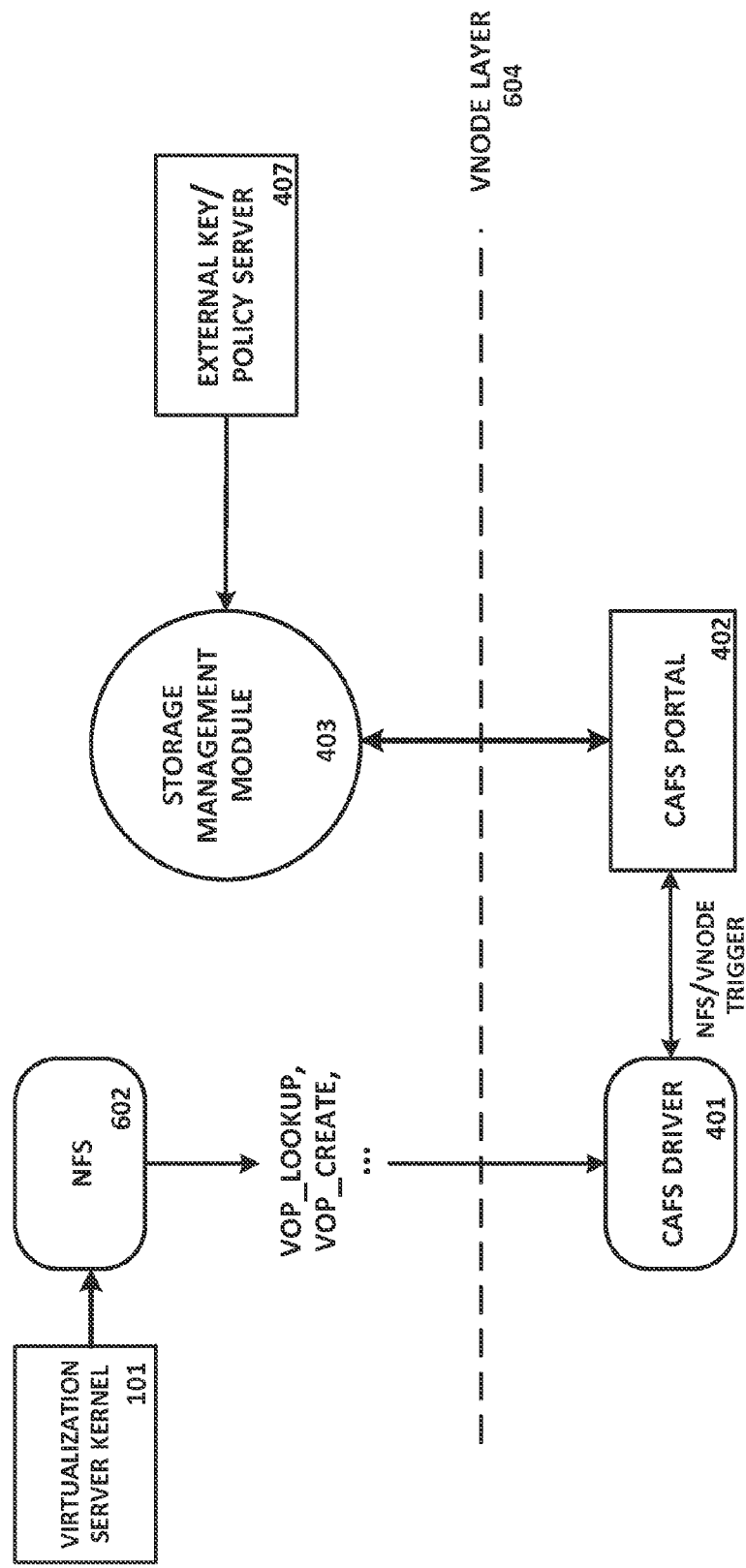
FIG. 6 is a block diagram illustrating policy evaluation in one embodiment.

CAFS reacts to vnode operations that affect the VM set. As an example shown in FIG. 6, when an attempt is made to access a VM, stored under /nfs/my_vmset/windows_xp and for which there is no cached policy descriptor, CAFS driver 401 executes the following sequence:

An NFSPROC_CREATE( ) request is generated by virtualization server kernel 101 which passes the request to NFS 602. NFS 602 calls VOP_CREATE( ), which results in a call to cafs_create( ). From the pathname for the create operation, CAFS driver 401 determines that a request is being made for the windows_xp VM that resides in the my_vmset VM set.

CAFS driver 401 sends a CREATE request to CAFS portal 402 which queues the request for processing by storage management module 403 (listening for requests via CAFS portal 402).

Storage management module 403 begins processing to determine whether the policy descriptor is stored locally. If the policy is not local (i.e., not present in storage management module 403), a request is sent (via secure communications module 405, not shown) to fetch the policy descriptor from key and policy server 407.

Storage management module 403 then looks at the policy to determine whether the CREATE request is allowed and returns this information back to CAFS driver 401 via CAFS portal driver 402.

CAFS driver 401 reacts in a similar manner to other vnode operations that affect the VM set (e.g., an NFSPROC_READDIR( ) request to view the contents of the VM set directory). Regardless of the operation requested. CAFS driver 401 responds by informing storage management module 403 which, in turn, requests that secure communications module 405 retrieve the policy descriptor from the key and policy server 407.

Mapping VMs to Storage Pools.

VM files are created based on properties of the policy descriptor. The policy descriptor contains, in addition to the policy parameters, a set of virtual objects that describe the mapping between VM files and the different storage pools available. The virtual objects also determine whether the file will be encrypted and if so, with what encryption key.

A VM consists of a number of files that can be divided into two basic types:

Disk Images, which are files that store blocks of information representing what would be a disk in the physical world. Bytes 0-511 represent block 0, bytes 512 to 1023 represent block 1, etc. in VMware® terminology, these files have a '.vmdk' extension, while the file extension is '.vhd' in Microsoft® Hyper-V terminology. The Citrix® open source Xen platform tends to promote the use of disk slices for VMs, but can also use files, although the virtual disk files have no specific naming scheme.

Metadata, which are any information that is not part of the VM disk images. Metadata include virtualization configuration files that inform the hypervisor of the resources that the VM needs to run (e.g., number of CPUs, networking configuration, disk information, etc.) and provide a snapshot of the memory image of the VM if the machine is suspended.

Most storage products used in virtualization environments do not offer any services that are particularly well-suited to the needs of the virtualization environment. For example, if SCSI is being used, the logical unit numbers are carved out from the block-based back-end storage, whereas if NFS is used, the NFS shares are exported and access is controlled through standard UNIX permission mechanisms. One problem with these approaches is that all storage is created equal within the virtualization environment, and therefore less important application data are stored identically to more critical data.

When creating the policy descriptor used by CAFS, the VM administrator is able to determine the type of storage and backup/disaster recovery capabilities of specific VMs and also of data classes within the VM. For example, a pseudo-storage policy for a VM with three virtual disks might be:

Meta Data:
Mirrors=2
Replicas=3
Export
 policy=ENCRYPT_ALL|LOCAL_PASSWD|LOW_AUDIT
Backup policy=ENCRYPT_ALL
Storage:
Disk-1=DE_DUP|NO_REPLTCAS|NO_MIRROR
Disk-2=ENCRYPT|REPLICATE|MIRROR
Disk-3=DE_DUP|REPLICATE|NO_MIRROR Within the policy descriptor, virtual objects are used to determine how to store one or more components within a VM. An exemplary fragment of the policy descriptor XML is shown below. The policy descriptor contains two policy statements (or "virtual objects" contained within each vobj tag) that map a file within a VM to its storage pool, describe the window in which the file can be accessed, the amount of audit data to be generated, and the encryption key to be used. If encryption is not required, the symkey tag will reference a "clear-text" key.

```
<vobj-list>
    <vobj>
        <vglob>*osdisk*</vglob>
        <symkey>062b9056-bf64-11df-8d3e-000c29abeb4d</symkey>
        <storepol>mirrored_pool_A</storepol>
        <access>Mon-Fri(9am-5pm)</access>
        <audit>all_records</audit>
    </vobj>
    <vobj>
        <vglob>hc_default</vglob>
        <symkey>01010101-0101-0101-0101-010101010101</symkey>
        <storepol>default_pool</storepol>
        <access>at_all_times</access>
        <audit>none</audit>
    </vobj>
</vobj-list>
```

A default virtual object (a "catch-all" policy) is included. In this example, an additional virtual object will match one or more virtual disks containing the word "osdisk":
 <vglob>*osdisk*</vglob>

Standard regular expressions are preferably used to match against the VM name and files within the VM. These regular expressions are simple enough to match any file within any VM that contains the word "osdisk". For example, if a VM set is exported through /nfs/my_vmset, the virtual object will match against each of the following virtual disks:

/nfs/my_vmset/windows_xp/osdisk1.vmdk
/nfs/my_vmset/windows_xp/osdisk2.vmdk
/nfs/my_vmset/rh_linux/linux_osdisk.vmdk
/nfs/my_vmset/rh_linux/root_osdisk.vmdk Regular expressions allow CAFS to match against any naming scheme used by any virtualization platform. VM administrators preferably use a meaningful naming scheme within VM templates to simplify VM administration and ensure that VM disks are recognizable.

CAFS Redirector Links.

Figure 7:
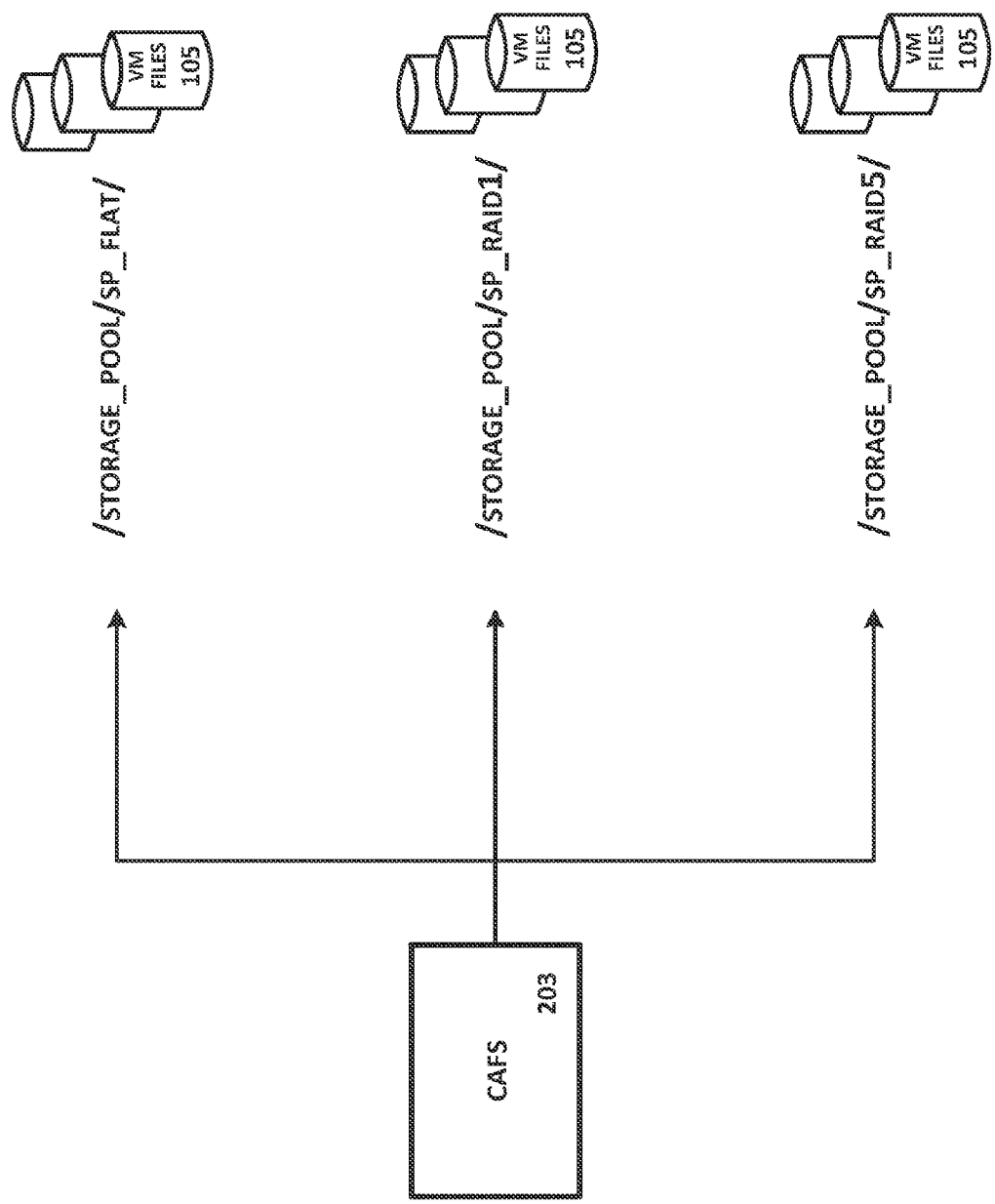
FIG. 7 is a schematic diagram illustrating a list of available storage pools in one embodiment.

Storage pools managed by CAFS 203 are separate physical file systems 104 that are created with the desired storage characteristics and performance. During system initialization, CAFS driver 401 builds a list of available storage pools so that it can map existing files to their correct location and can store newly created files in the storage pool that policy dictates. An exemplary list for three different storage pools (sp_flat, sp_raid1, and sp_raid5) is shown in FIG. 7. In this embodiment, storage pool file systems (e.g., symbolically named RAIDS) can be found under the /storage_pools directory as shown on the right hand side of the figure. Whenever CAFS is running, storage pool mapper 404 maintains a link to each storage pool file system.

Storage pool mapper 404 also maintains a mapping between files seen by hypervisor 102 and actual files stored within each storage pool 206. Hypervisor 102, however, is unaware of how files are stored and of the mapping between what the hypervisor sees and the actual storage location of the files. Hypervisor 102 accesses a VM file 105 by going through a redirector file created by CAFS driver 401. As an example, to store file /hcs/nfs/vm_set1/win_xp/winxp.vmx to a VM, hypervisor 102 sends a CREATE request which is intercepted by CAFS driver 401.

If the CREATE request for a specific VM file 105 matches a rule in the VM policy (obtained from external key and policy server 407) that requires a specific storage pool, storage management module 403 informs CAFS driver 401 that the VM has been authenticated, that a VM file 105 can be created, and where the VM file 105 should reside. CAFS driver 401 then creates the VM file 105 in the file system namespace of the storage pool (/storage_pools/sp_raid1/vm_set1/win_xp/winxp.vmx) and creates the redirector file (/cafs/vm_set1/win_xp/winxap.vmx##sp_raid1).

Each VM set contains directories for each VM within its correct storage pool along with a list of redirector files. When hypervisor 102 wants to obtain the list of files in a VM, hypervisor 102 issues an NFS_READDIR( ) operation which translates to a call into CAFS driver 401 through vnode operation cafs_readdir( ).

The cafs_readdir( ) vnode operation performs the mapping between what a virtualization server expects and how the files are actually stored on disk. This mapping layer has a number of advantages including the ability to move a file dynamically within the VM from one storage pool to another by modifying only the redirector link for the move to take effect. In the example above, the file /hcs/nfs/vm_set1/win_xp/winxp.vmx is contained within the sp_raid1 storage pool. To move this file to the sp_raid5 storage pool, the file is copied from /storage_pools/sp_raid1 to /storage_pools sp_raid5/, and the redirector link is changed to /cafs/vm_set1/win_xp/winxp.vmx##sp_raid5. Hypervisor 102 remains unaware of these changes, and of the original or modified location of the VM file 105.

NFS/VNODE Triggers.

CAFS is able to determine actions being taken by any supported hypervisor. For example, in response to an NFS request to access a /mnt directory, a file handle for the /mnt directory is returned and two operations are performed:

NFSPROC_LOOKUP ↓ Looking up a file inside the /mnt directory to CAFS means that a VM needs to be opened. Before access is granted, CAFS driver 401 (1) determines whether hypervisor 102 has the correct access rights and (2) downloads the policy that applies to this VM set. If the virtualization server is authenticated and the VM is allowed to run on the requesting hypervisor, CAFS driver 401 allows access to the files that comprise the VMs.

NFSPROC_MKDIR ↓ This NFS operation informs CAFS driver 401 that a new VM is being created. For example, an NFSPROC_MKDIR operation for /mnt/vmset_a/myVM results in creation of a new VM called myVM within the VM set vmset_a.

Because CAFS sits at the VFS/vnode layer, the NFS operations described above map to vnode operations at the file system layer. For example, NFSPROC_MKDIR will result in a call to the cafs_mkdir( ) vnode operation. CAFS driver 401 then responds with an up-call to storage management module 403 to determine what to do with the call based on the VM set policy.

Referring again to FIG. 6, when an NFS operation is received, this triggers CAFS driver 401 to invoke storage management module 403 by placing a request in CAFS portal 402 request queue. Once the request is received by storage management module 403, the request is matched to an appropriate VM set policy and associated policy descriptor. As an example, a request may be made from ESX Server 10.2.45.67 to create a directory called windows_vm under the path /nfs/my_vmset. This request corresponds to the first step in creation of a new VM. CAFS driver 401 first determines whether this server has the right privileges and is in the right time window to be able to create this VM. Assuming the server is authenticated, calls to create files within the new directory are matched with the virtual objects list to determine the storage pool needed for the file and whether the file should be encrypted.

Encryption Mechanism.

CAFS implements encryption on selected portions of the VM using industry standard encryption algorithms such as, without limitation, the Advanced Encryption Standard (AES, e.g., AES-128 or AES-256). The VM components to encrypt are determined by the policy descriptor which in turn references symmetric encryption keys that are used to perform the encryption/decryption.

VM files are encrypted or decrypted by intercepting read/write operations (e.g., VOP_READ( ) VOP_STRATEGY( ) and VOP_WRITE( ) at the vnode layer. Encryption or decryption of VM files is performed using an encryption framework, preferably BSD Open Cryptographic Framework (OCF) which also allows the addition of hardware cryptographic support.

CAFS preferably uses Advanced Encryption Standard (AES)-128 or AES-256 encryption with a cipher-block chaining (CBC) mode. CBC generates a cipher text (encrypted data) for a given plaintext (unencrypted data) by XORing the AES-generated cipher text with a previous AES-sized block (16 bytes). This, however, forces the OCF to read the prior block whenever a read/write request is issued in order to retrieve the previous 16 bytes to use as the initialization vector (IV). The only exception to this process is for the first 16 bytes (i.e., when the file pointer is set to the beginning of the file), in which case a well-known IV can be used. Using this encryption mode negatively impacts performance because so much data need to be read. CAFS attenuates this impact on performance by using an encrypted salt-sector initialization vector (ESSIV) method (e.g., preferably ESSIV 2010) which generates an initial IV for each sector-sized (512 byte) read/write operation by combining a sector number with a hash of the encryption key used for the file. The ESSIV method is known in the art, as described at http://en.wikipedia.org/wiki/Disk_encryption_theory, incorporated by reference herein.

Authentication.

During the bootstrap process, CAFS driver 401 starts up, and secure communications module 405 authenticates the virtualization server with key and policy server 407. This authentication allows CAFS driver 401 to make subsequent calls to retrieve policy descriptors and encryption keys as VM sets and VMs are being accessed. Specifically, when a subsequent attempt is made to access a VM, CAFS driver 401 determines whether the request is coming from a previously authorized virtualization server. If so, CAFS driver 401 obtains from encryption/key management module 405 the appropriate VM set policy and encryption keys so that CAFS driver 401 can decrypt data appropriately (for VMs that already exist) or can know how to store VMs that are being created. Virtualization servers that are not authorized are prevented from accessing VM sets using standard NFS export mechanisms. CAFS can also prevent access to VM sets from authenticated servers during specified time windows.

Access to a particular VM set or VM is determined in part by pathname and NFS operations (NFSPROC_LOOKUP, NFSPROC_CREATE, etc.) and in part by the way that the polices are defined by the administrator and associated with either a mount point or a position with a specific pathname. Specifically, CAFS responds to NFS (vnode) operations that in turn reference VM sets or the VMs contained within. For example:

NFS_LOOKUP: a mount point is unlikely to refer to a specific VM, and, in fact, multiple VM sets may reside under the same NFS mount point as shown below:
/nfs/vmset-A/VM-1—VM set 1
/nfs/vmset-A/VM-2—VM set 1
/nfs/vmset-B/VM-1—VM set 2
In this example, two VM sets reside under the same mount point (/nfs). As part of policy definition, an administrator designates a position within the pathname where the policy resides. The administrator can specify that a mount point itself is governed by a VM set policy or that multiple VM set polices reside under the same mount point.

Other NFS operations within a specific VM or VM set: Because NFS is stateless, (i.e., there is no NFSPROC_CLOSE operation), CAFS driver 401 does not know when access to a VM ceases (other than by recording a lack of access over a specific period of time). Thus, any operation within a specific mount point outside of a window of access time is denied.

Auditing.

Because the operating system under which CAFS runs is preferably securely locked down to prevent tampering, system information is not available using traditional means such as logging into the machine and running diagnostic utilities. Instead, when a VM is accessed, CAFS tracks and generates audit records about VM and VM set usage by the organization or service provider. These records provide information that CSPs use to provide per-customer billing. Specifically, CAFS tracks logging/auditing information useful in both data centers and within cloud computing environments, including, without limitation: (1) access information (i.e., information about who is accessing which VM set and which VM within the set, when the access occurs, the type of access (lookup, read or write), and the name of the server seeking access); (2) system information (e.g., diagnostic information about the machine environment in which CAFS is running which can be used by administrators to determine faults within the VMs and VM sets); and (3) capacity planning information (e.g., how much storage is available, which VM sets are occupying how much space, and when disk space crosses a predefined thresholds (e.g., 80% full) so CSPs can easily charge their customers based on expected and actual storage use. CAFS has the ability to generate both alerts and log messages. The location to which these alerts and log messages are to be sent is contained within the VM set policy.

Secure Storage of VM Files.

Figure 8:
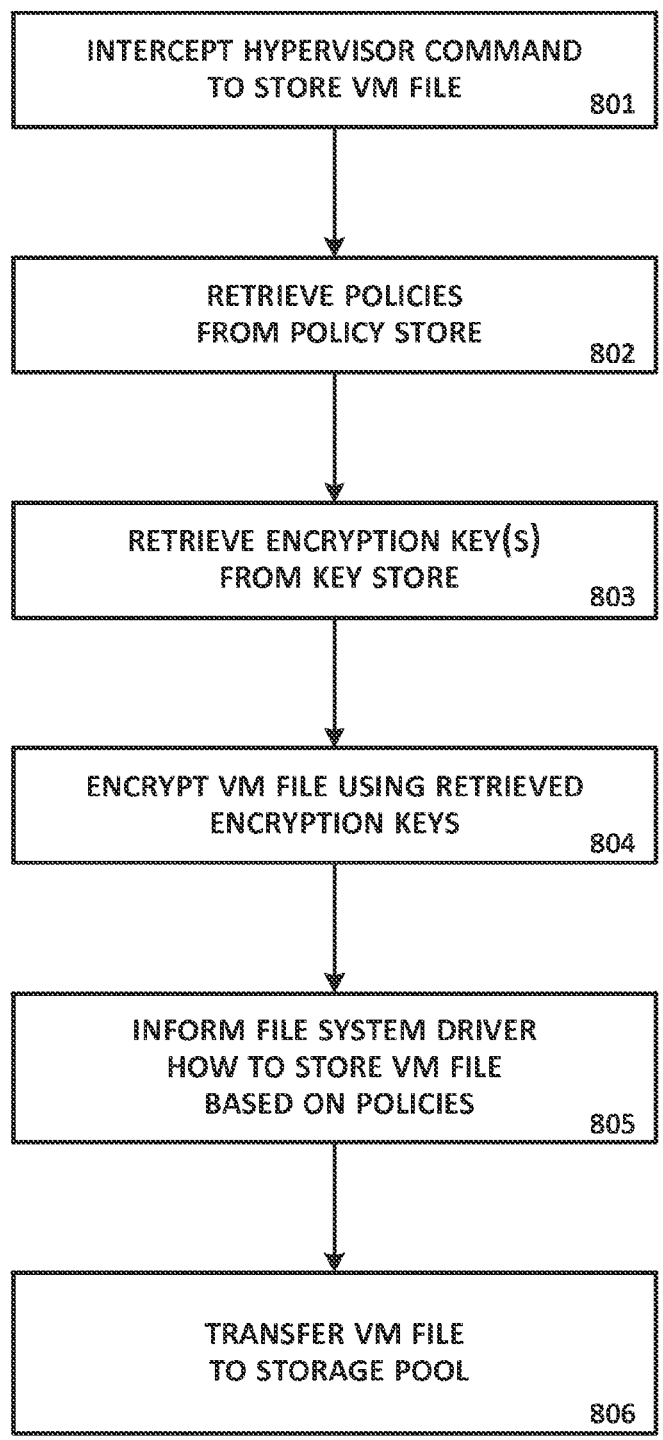
FIG. 8 is an exemplary process flow detailing the method to securely store virtual machine files.

An exemplary flow chart detailing one embodiment of a method to securely store VM files 105 is presented in FIG. 8. In step 801, CAFS driver 401 intercepts a command from hypervisor 102 to store one or more VM file 105. CAFS driver 401 communicates that request through CAFS portal 402 to storage management module 403, which in turn requests secure communications module 405 to retrieve policies and encryption keys for the VM set containing the one or more VM file 105.

In step 802, secure communications module 405 communicates with external key and policy server 407 to fetch the policy descriptor containing one or more policy for VM file(s) 105.

In step 803, secure communication module 405 communicates with encryption/key management module 407 to determine whether one or more encryption key is needed. If any encryption key is needed, secure communications module 405 communicates with external key and policy server 407 to fetch the necessary encryption key(s) for the VM file(s) 105 to be stored.

In step 804, encryption/key management module 406 obtains (from secure communication module 405) the encryption key(s) for the VM file(s) 105 to be stored, and then transfers the encryption key(s) to CAFS driver 401. CAFS driver 401 encrypts (at least in part) the VM file(s) using the encryption key(s) obtained from encryption/key management module 406.

In step 805, storage management module 403 obtains the policy descriptor from secure communication module 405. Storage management module 403 informs CAFS driver 401 how to store the VM file(s) 105 based on the policy descriptor obtained from storage management module 403.

In step 806, CAFS driver 401 transfers the at least partially encrypted VM file(s) 105 through the physical file system to one or more storage pool 206 based on the policies contained within the policy descriptor.

Access to Securely Stored VM Files.

Figure 9:
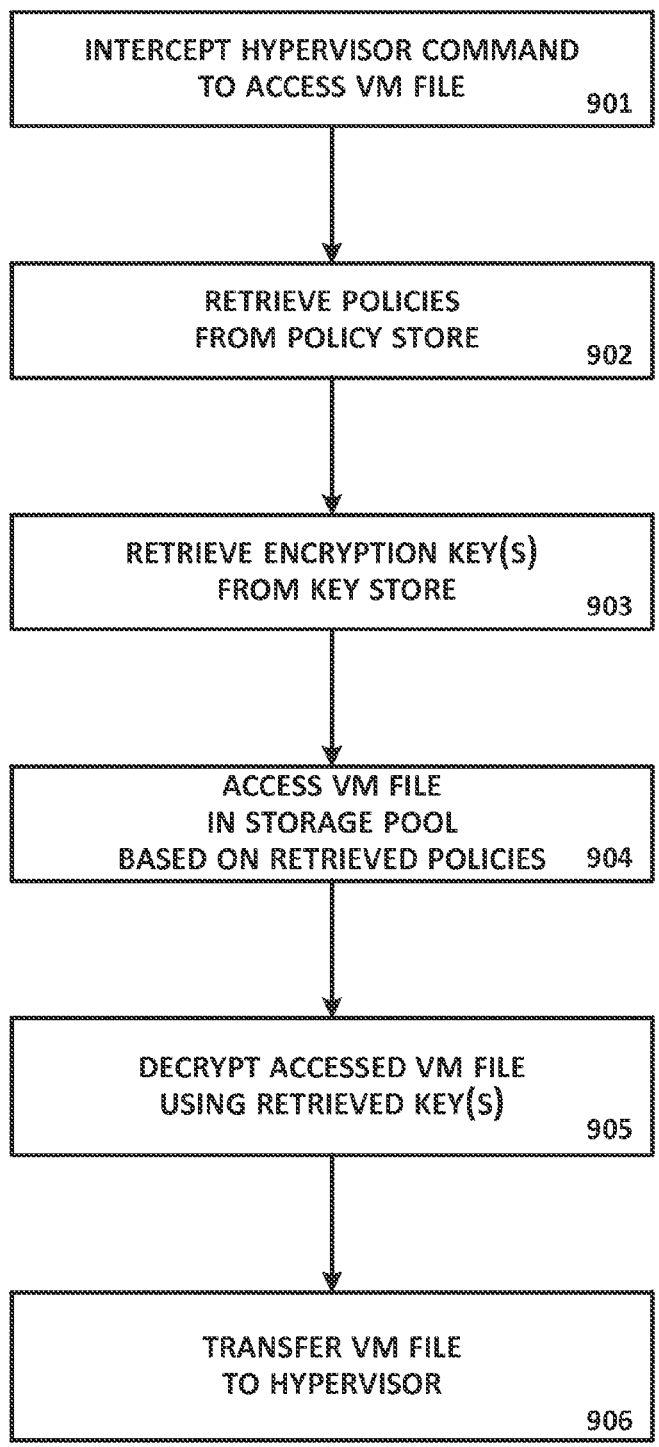
FIG. 9 is an exemplary process flow detailing the method to access securely stored virtual machine files.

An exemplary flow chart detailing one embodiment of a method to access securely stored VM files 105 is presented in FIG. 9. In step 901, CAFS driver 401 intercepts a command from hypervisor 102 to access one or more at least partially encrypted VM file 105 securely stored in one or more storage pool 206. CAFS driver 401 communicates that request through CAFS portal 402 to storage management module 403. Storage management module 403 determines whether the policy descriptor for the encrypted VM file(s) 105 is stored locally. If the policy descriptor is not stored locally, storage management module 403 requests secure communications module 405 to retrieve policies and any necessary encryption key(s) for the VM set containing the encrypted VM file(s) 105. If the policy descriptor is stored locally, storage management module 403 requests secure communications module 405 to retrieve the encryption key(s) for the VM set containing the encrypted VM file(s) 105.

In step 902, secure communications module 405 communicates with external key and policy server 407 to fetch, if necessary, the policy descriptor containing one or more policy for the encrypted VM file(s) 105. Storage management module 403 obtains the policy descriptor, if necessary, from secure communications module 405, and informs CAFS driver 401 of policies governing access to the encrypted VM file(s) 105.

In step 903, secure communication module 405 communicates with external key and policy server 407 to fetch the encryption key(s) for the encrypted VM file(s) 105. Secure communications module 405 conveys the encryption key(s) to encryption/key management module 406.

In step 904, CAFS driver 401 accesses (through the physical file system) the encrypted VM file(s) 105 stored in one or more storage pool. CAFS' access is based on one or more policy contained within the policy descriptor obtained from storage management module 403.

In step 905, CAFS driver 401 decrypts the accessed encrypted VM file(s) 105 using the encryption key(s) obtained from encryption/key management module 406.

In step 906, CAFS driver 401 transfers the decrypted VM file(s) 105 to hypervisor 102.

It is to be understood that embodiments of the system and method herein can all be implemented in software stored in a computer readable storage medium for access as needed to run such software on the appropriate processing hardware of the computing system.

It is to be understood that the examples given are for illustrative purposes only and may be extended to other implementations and embodiments with different conventions and techniques. For example, although FreeBSD is used as an exemplary operating system for descriptive purposes throughout the specification, there is no intent to limit the disclosure to that operating system, or to any embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:
1. A method, comprising:
intercepting, by a virtual file system instantiated on a first computing system, a command to store one or more files which define one or more virtual machines, the command intercepted from a hypervisor instantiated on a second computing system, wherein the first computing system is separate from the second computing system;
for at least one of the one or more files, receiving by the virtual file system a policy associated with the file from a policy server and receiving by the virtual file system an encryption key associated with the file from a key server;

encrypting, by the virtual file system, a first portion of the at least one or more files using at least one of the one or more encryption keys, but not encrypting a second portion of the at least one or more files, wherein the encrypted first portion comprises application data and the non-encrypted second portion does not comprise application data; and transmitting, by the virtual file system, the encrypted first portion and the non-encrypted second portion from the virtual file system to a physical file system instantiated on a third computing system and informing a file system driver how to store the encrypted first portion and the non-encrypted second portion based on the one or more policies, wherein the physical file system stores the encrypted first portion and the non-encrypted second portion in a storage system based on the one or more policies received from the policy server.

2. The method of claim 1, wherein the one or more policies are selected based on a globally unique identifier (GUID) stored with each of the one or more files.

3. The method of claim 1, wherein the one or more encryption keys are selected based on a globally unique identifier (GUID) stored with each of the one or more files.

4. The method of claim 1, wherein the storage system comprises a plurality of storage pools, and further comprising determining which one of the storage pools to store a first one of the one or more files based on the one or more policies.

5. The method of claim 1, wherein the storage system comprises a plurality of storage pools, and further comprising determining which one of the storage pools to store a first one of the one or more files based on the one or more policies and a characteristic of the first file.

6. The method of claim 1, wherein the first computing system is a first physical host and the second computing system is a second physical host.

7. A first computing system, comprising:
a storage device;
a processor communicatively coupled to the storage device; and
software instructions on the storage device that, when executed by the processor, cause the processor to perform tasks of a virtual file system, the tasks including:
    intercepting a command to store one or more files which define one or more virtual machines, the command intercepted from a hypervisor instantiated on a second computing system, wherein the first computing system is separate from the second computing system;
    for at least one of the one or more files, receiving a policy associated with the file from a policy server and receiving an encryption key associated with the file from a key server;
    encrypting a first portion of the at least one or more files using at least one of the one or more encryption keys, but not encrypting a second portion of the at least one or more files wherein the encrypted first portion comprises application data and the non-encrypted second portion does not comprise application data; and
    transmitting the encrypted first portion and the non-encrypted second portion from the virtual file system to a physical file system instantiated on a third computing system and informing a file system driver how to store the encrypted first portion and the non-encrypted second portion based on the one or more policies, wherein the physical file system stores the encrypted first portion and the non-encrypted second portion in a storage system based on the one or more policies received from the policy server.

8. The first computing system of claim 7, wherein the one or more policies are selected based on a globally unique identifier (GUID) stored with each of the one or more files.

9. The first computing system of claim 7, wherein the one or more encryption keys are selected based on a globally unique identifier (GUID) stored with the one or more files.

10. The first computing system of claim 7, wherein the first computing system is a first physical host and the second computing system is a second physical host.

11. A non-transitory machine-readable storage medium for a first computing system having (i) a storage device, and (iii) a processor communicatively coupled to the storage device, the non-transitory machine-readable storage medium comprising software instructions that, when executed by the processor, cause the processor to perform tasks of a virtual file system, the tasks including:
    intercepting a command to store one or more files which define one or more virtual machines, the command intercepted from a hypervisor instantiated on a second computing system, wherein the first computing system is separate from the second computing system;
    for at least one of the one or more files, receiving a policy associated with the file from a policy server and receiving an encryption key associated with the file from a key server;
    encrypting a first portion of the at least one or more files using at least one of the one or more encryption keys, but not encrypting a second portion of the at least one or more files, wherein the encrypted first portion comprises application data and the non-encrypted second portion does not comprise application data; and
    transmitting the encrypted first portion and the non-encrypted second portion from the virtual file system to a physical file system instantiated on a third computing system and informing a file system driver how to store the encrypted first portion and the non-encrypted second portion based on the one or more policies, wherein the physical file system stores the encrypted first portion and the non-encrypted second portion in a storage system based on the one or more policies received from the policy server.

12. The non-transitory machine-readable storage medium of claim 11, wherein the one or more policies are selected based on a globally unique identifier (GUID) stored with each of the one or more files.

13. The non-transitory machine-readable storage medium of claim 11, wherein the one or more encryption keys are selected based on a globally unique identifier (GUID) stored with the one or more files.

* * * * *